US011266154B2

(12) United States Patent
Venturini et al.

(10) Patent No.: US 11,266,154 B2
(45) Date of Patent: Mar. 8, 2022

(54) METHOD FOR PRODUCING PANIGACCI

(71) Applicant: F.LLI VENTURINI S.R.L., Podenzana (IT)

(72) Inventors: Andrea Venturini, Mulazzo (IT); Luca Venturini, Sarzana (IT); Nicola Venturini, Mulazzo (IT)

(73) Assignee: F.LLI VENTURINI S.R.L., Podenzana MS (IT)

( * ) Notice: Subject to any disclaimer, the term of this patent is extended or adjusted under 35 U.S.C. 154(b) by 0 days.

(21) Appl. No.: 15/769,008

(22) PCT Filed: Oct. 24, 2016

(86) PCT No.: PCT/IB2016/056390
§ 371 (c)(1),
(2) Date: Apr. 17, 2018

(87) PCT Pub. No.: WO2017/068558
PCT Pub. Date: Apr. 27, 2017

(65) Prior Publication Data
US 2019/0053497 A1 Feb. 21, 2019

(30) Foreign Application Priority Data
Oct. 23, 2015 (IT) .......................... 102015000065029

(51) Int. Cl.
*A21B 3/13* (2006.01)
*A21D 13/43* (2017.01)
(Continued)

(52) U.S. Cl.
CPC .............. *A21D 8/06* (2013.01); *A21D 13/43* (2017.01); *A23L 5/10* (2016.08); *A21B 1/48* (2013.01);
(Continued)

(58) Field of Classification Search
CPC ........ A47J 37/0611; A47J 27/02; A47J 37/01; A47J 37/015; A21C 5/006; A21C 9/081;
(Continued)

(56) References Cited

U.S. PATENT DOCUMENTS 3,092,014 A * 6/1963 Macchi ................. A47J 37/105
99/423
4,034,119 A * 7/1977 Kanbe ..................... A21C 15/00
426/497
(Continued)

FOREIGN PATENT DOCUMENTS

WO WO-2006084638 A2 * 8/2006 ............... A21B 5/03

OTHER PUBLICATIONS

Cosabolle NPL, published Apr. 16, 2013, https://cosabolle.wordpress.com/2013/04/16/how-to-make-panigacci-and-focaccette/ (Year: 2013).*
(Continued)

*Primary Examiner* — Drew E Becker
*Assistant Examiner* — Bryan Kim
(74) *Attorney, Agent, or Firm* — Stein IP, LLC (57) ABSTRACT

A method and an apparatus for making panigacci. The method includes the steps of prearranging a plurality of dishes in terracotta; heating the dishes at a temperature higher than 280-300° C. to make a plurality of hot dishes; arranging a first hot dish in a plane, and distributing a first dose of dough; arranging a second hot dish on the first dish, in order to squeeze the dough between the two dishes, and distributing a second dose of dough on the second dish, and the like with following arranging and distributing, up to an end of the plurality of hot dishes, by making a stack of hot dishes interspersed by dough, with subsequent cooking of the dough and preparing panigacci after separating the dishes by the stack. Before the step of arranging a step is provided of exposition of each hot dish at a temperature
(Continued)

sensor, and a step of measuring the temperature T of each hot dish with production of a signal of temperature that is provided to a control unit. Furthermore, a step is provided of comparison of the temperature T with limit values T1 and T2 by the control unit, which is configured to provide a consent signal in case that T1<T<T2. The step of distributing is made by a distribution unit that provides to the dish a predetermined dose of dough. The distribution unit being operated through the control unit to provide the dose in the presence of the consent.

16 Claims, 10 Drawing Sheets

(51) Int. Cl.
 *A21D 8/06* (2006.01)
 *A21B 1/48* (2006.01)
 *A21B 5/02* (2006.01)
 *A23L 5/10* (2016.01)

(52) U.S. Cl.
 CPC ............... *A21B 3/132* (2013.01); *A21B 3/134* (2013.01); *A21B 5/02* (2013.01)

(58) Field of Classification Search
 CPC ........... A21C 9/08; A21C 9/083; A21C 9/086; A21C 14/00; A23L 5/10; A23L 5/12; A23L 5/15; A23L 5/17; A23L 5/00; A23L 7/10; A23L 7/198; A21D 13/43; A21D 8/06; A21D 10/007; A21D 10/02; A21D 10/04; A23P 30/10
 USPC .............. 99/325–328, 329 R, 329 P, 329 RT, 99/331–334, 356, 373, 443 C
 See application file for complete search history.

(56) References Cited

U.S. PATENT DOCUMENTS

| | | | | |
|---|---|---|---|---|
| 5,731,022 A | * | 3/1998 | Cummins | A21C 1/00 222/55 |
| 6,190,450 B1 | * | 2/2001 | O'Toole | C04B 28/04 106/711 |
| 6,196,117 B1 | * | 3/2001 | Haas | A21B 5/02 99/353 |
| 6,450,086 B1 | * | 9/2002 | Martinez Ruiz | A21B 1/26 99/352 |
| 6,894,252 B2 | * | 5/2005 | Paller | A21B 1/26 219/400 |
| 10,182,574 B2 | * | 1/2019 | Ruiz | A21D 10/025 |
| 2011/0027415 A1 | * | 2/2011 | De Acutis | A21B 5/02 426/18 |
| 2011/0059211 A1 | * | 3/2011 | Chandi | A21D 8/06 426/243 |
| 2011/0269085 A1 | * | 11/2011 | Wiker | A21B 1/40 432/4 |
| 2015/0208871 A1 | * | 7/2015 | Chang | A47J 31/401 99/325 |
| 2015/0216363 A1 | * | 8/2015 | Chen | A47J 36/32 99/326 |

OTHER PUBLICATIONS

Il Panigaccio di Podenzana—Toscana Nascosta, Jan. 16, 2014, pp. 1-3, https://toscanascosta.blogspot.com/2014/01/il-panigaccio-di-podenzana.html.
I panigacci lunigianesi—ItalyzeMe, Jul. 10, 2016, pp. 1-5, https://italyze.me/gusta/dispensa/panigacci/.
Panigacci: buoni e antichi—Natura Estrema, pp. 1-5, https://www.naturaestrema.it/cibi-bio/210/a/.
Temperature of a "Red Hot" Object—The Physics Factbook, p. 1, https://hypertextbook.com/facts/2000/StephanieL.um.shtml.

* cited by examiner

METHOD FOR PRODUCING PANIGACCI

CROSS-REFERENCE TO RELATED APPLICATIONS

This application is a national stage of International Application No. PCT/IB2016/056390, filed Oct. 24, 2016, which claims the benefit of priority to Italian Application No. 102015000065029, filed Oct. 23, 2015, in the Italian Patent Office, the disclosures of which are incorporated herein in their entireties by reference.

FIELD OF THE INVENTION

The present invention relates to the food industry, and, in particular, it relates to a machine for making panigacci, typical product of the Lunigiana.

DESCRIPTION OF THE PRIOR ART

As known, the panigacci are a type of round bread made starting from a fluid dough, made with water, flour and salt, which is cooked between clay dishes, so-called "testi", previously heated at high temperatures. Panigacci bake in the dishes in a few minutes and don't need yeast.

More precisely, instead of baking in the oven, the dough is poured in red-hot dishes already extracted from the oven or from fire. In any dish a dose of dough is poured and immediately after is overlaid another dish, on which in turn other dough is poured and overlaid over yet another dish, and so on up to form a stack of 10-20 dishes interspersed with dough.

Thus every dish crushes the underlying dough until it reaches a nearly constant thickness and round shape. The dough standing between the hot dishes cooks in minutes on both sides, forming panigacci. The stack is then dismantled and the panigacci are detached from the dishes with a blade or vane. They are traditionally served in baskets and are used as a relish for meats and soft cheese, or even desserts.

It is desirable for the restaurants and cafes to create a large number of panigacci to serve to customers freshly cooked, when they have the best flavor and aroma. However, the cooking technique does not allow to achieve a high number of panigacci, with waiting times that are not negligible for customers.

For faster heating the dishes, it is known to use a carousel grid, arranged in an open oven or over a bed of embers or over a flame. In this way, by turning the grid, the cold dishes are introduced in the oven and the hot dishes are extracted bringing them to an external position from where they can be easily picked up without burning.

The traditional method is shown, for example, in the Youtube video "Il Panigaccio di Podenzana secondo la ricetta originale"available on the website" www.youtube.com/watch?v=WWariDiZX6Y" and published on 30 Sep. 2013.

A first problem is the dosage of the right amount of dough to put in the dishes, that is normally done manually. Putting too much dough means making a higher panigaccio, but sometimes raw inside. Putting too little dough can cause a panigaccio too thin and then dry or burned. For this reason, for each stack of dishes that is "unmounted", often panigacci are obtained very different from each other.

Furthermore, the dishes are placed on the grid and extracted always one by one, with the difficulty of heating them in a homogeneous way, since the time of the permanence on the flame can vary greatly from dish to dish.

A further problem is that the dishes extracted from the oven or from fire are often red-hot and not all at the same temperature. This is because in order to know when to pull out the dishes, the cook usually waits them to be red-hot, as they turn red and are easily recognizable. Obviously, this brings the dishes to have a very high temperature and not definable with precision.

In traditional cooking this high temperature is accepted as it makes very quickly crispy the outer surface of panigaccio. However, generally, the inside part remains partially raw, making the product indigestible to some users. In addition, if the dishes in the stack are at very different temperatures between them, the cooking of some may be acceptable, but others may burn excessively, resulting inedible and not salable.

It is therefore desirable to solve the above problems. On the other hand, it is desirable to retain the original way of cooking panigacci, in order not to distort a traditional product.

SUMMARY OF THE INVENTION

It is therefore a feature of the present invention to provide a method for making panigacci that solves the above described problems.

It is therefore a feature of the present invention to provide a machine for making panigacci that carries out this method.

In particular, it is a feature of the present invention to provide a method and a machine for making panigacci that allows increasing the production of panigacci per time unit, while maintaining the traditional cooking.

It is another particular feature of the present invention to provide a method and a machine for making panigacci wherein there is an uniform heating of all the dishes, with possibility to easily insert the cold dishes and to easily extract the hot dishes.

It is also a feature of the present invention to provide a method and a machine for making panigacci, where the dosage of the amount of dough to put in the dishes is improved in precision.

It is a further feature of the present invention to provide a method and a machine for making panigacci, where the temperature of the dishes is as much as possible homogeneous when the dough is poured.

It is still a feature of the present invention to provide a method and a machine for making panigacci, where the product is cooked homogeneously, not resulting either burned or partially raw.

The above described objects are achieved by a method for making panigacci according to the invention which provides the steps of:
  prearranging a plurality of terracotta dishes;
  heating the dishes at a temperature higher than 280-300° C. to obtain a plurality of hot dishes;
  arranging a first hot dish on a plane, and distributing a first dose of dough;
  arranging a second hot dish on the first dish, in order to squeeze the dough between the two dishes, and distributing a second dose of dough on the second dish, and the like with following dispositions and distributions, up to end the plurality of dishes, with making a stack of hot dishes interspersed by dough, with subsequent cooking of the dough and obtaining panigacci after separating the dishes by the stack,
  whose characteristic is that before the step of arranging a step is provided of exposing each dish to a temperature sensor, and a step of measuring the temperature T of each dish with production of a signal of temperature that is provided to a control unit that a step is provided of comparing of the temperature T with limit values T1=280° C. and T2=360° C. by the control unit, which is configured to provide a consent signal in case occurs that T1<T<T2, that the step of distributing is made by a distribution unit that provides to the dish a predetermined dose of dough, and that the distribution unit is operated through the control unit to provide the dose in the presence of the consent.

This way, it is possible to obtain a cooking that do not burns the outer of the panigaccio and comes to affect also the internal parts. In fact, owing to the step of comparison of the temperature, it is not necessary, as in the traditional prior art, to wait that the dishes become red-hot in order to ascertain when it is necessary extract them by the oven: the dishes are instead extracted from the oven at an ideal temperature for carrying out a homogeneous cooking of the panigaccio and making it then more digestible. Furthermore, this temperature is the same for all the dishes extracted, allowing to further reduce the possibility that some panigaccio of the stack remains more raw or is burnt.

In particular, the ideal temperature T of the dishes can be chosen with T1=300° C. and T2=340° C., and much more preferably with T1=310° C. and T2=330° C.

Furthermore, it is possible, by the distribution unit, a precise distribution of a dose of dough, avoiding putting too much or too less dough, with subsequent inhomogeneity of cooking and of final result.

The above described objects are also achieved by an apparatus for making panigacci according to the invention which comprises:

a heating unit of terracotta dishes at a temperature higher than 280-300° C.;

an arrangement zone of hot dishes exiting from the heating unit, so that in the arrangement zone is arranged a first hot dish, a first dose of dough on the first dish, a second hot dish on the first dish, in order to squeeze the dough between the two dishes, a second dose of dough on the second dish and the like with following dispositions and distributions, up to the end of the plurality of dishes, by making a stack of hot dishes interspersed by dough, with subsequent cooking the dough and preparing panigacci, whose characteristic is that next to the arrangement zone a temperature sensor is provided towards which each dish is exposed, the temperature sensor being configured for producing a signal of temperature T measuring the temperature of each dish a control unit arranged to receive the signal of temperature T and configured for carrying out a comparison of the temperature T with limit values T1 and T2 and to provide a consent signal in case occurs that T1<T<T2, at the arrangement zone a distribution unit is arranged configured to provide to each dish a predetermined dose of dough, said control unit being configured for distributing the distribution unit to provide the dose in the presence of the consent.

Such apparatus, in addition to achieve the advantages already shown for method, can be easily manufactured and is of minimum encumbrance for a restaurant or local for preparing panigacci.

Advantageously, the distribution unit comprises a hopper containing dough, and a dosing element at the basis of the hopper.

The distribution unit allows giving a precise dose of dough on each dish, in a time very short, speeding up to prepare stack, and then avoiding that between the arrangement of the first and last dishes passes too much time, with subsequent inhomogeneity of cooking.

In particular, the dosing element is operated electrically, for causing the predetermined dose of dough to fall in a dish located underneath. This makes it possible to operate the distribution of the dose of dough with an easy drive, without making an operator to lose too much time.

Advantageously, the dosing element comprises a volumetric pump operated by a motor. This way, it is increased the precision of dosing. In particular, the volumetric pump is a gear pump.

Advantageously, the heating unit comprises an oven with a conveyor belt for carrying the dishes between an input, wherein cold dishes are arranged, and an outlet, from which hot dishes exit. This allows to expose the dishes in the oven for a homogeneous time for all the dishes, increasing the accuracy of temperature at the time of the temperature measurement, by reducing the waiting time or the dishes too cold to be discarded.

Preferably, the oven provides as input a slide, in such a way that the operator can introduce the cold dishes on the slide, so that they reach the conveyor belt by gravity. This way, the feeding in the oven is made automatically by the slide and by the conveyor belt of the oven, allowing the operator not to caring to the heating step of the dishes.

Advantageously, the control unit comprises a display unit which indicates if a dish subject to measure temperature is inside or outside the condition T1<T<T2. This also allows a visual control of the operator, who can choose to anticipate the issuance of the dough dose compared to the times set by the machine.

Advantageously, the control unit is configured for operating the distribution unit by means of an element selected from the group consisting of: an automatic drive that operates automatically the dosing element in the presence of the consent, a manual key, a pedal, a wireless remote control.

Advantageously, the basement is arranged above the oven. This way, it is possible to provide a working zone very compact, for example for providing the position in places with not much space, or in mobile kiosks.

Advantageously, a conveyor is provided for bringing dishes to heat by the basement to the oven. This way, it is obtained a circular path that makes it possible for a single operator, which is located between the conveyor, on the one hand, and the plane support and the oven, by the other, to carry out all the operations necessary to prepare panigacci.

In an exemplary embodiment, the basement is located opposite to a plane of decomposition of the stack and at the entrance of the oven. It is then provided a conveyor for bringing the stack of the dishes and of the panigacci in phase of cooking towards the plane of decomposition. This way, with this configuration can be allowed to a single operator, or to two operators that are located between the conveyor, on the one hand, and the oven, by the other, to carry out all the operations of preparation, depending on the reasons of production rate. In particular, the conveyor that brings the stack has a time of carrying the stack equal to the time of cooking, so that the operator knows that when the stack is at the end of the conveyor belt it is ready for being decomposed, giving a rate for optimizing the preparation.

In a possible embodiment, the basement is located opposite to the oven, being provided a conveyor for bringing the hot dishes from the oven to the basement and a conveyor for bringing the dishes to heat from the basement to the oven. This way, it is obtained an island with high effectiveness for a single operator.

In a possible alternative embodiment, the temperature sensor is arranged so that the measurement of the temperature of the hot dishes is carried out directly in the oven or immediately at the outlet of the oven itself. In particular, the control unit is configured for sending a control signal to a board for controlling the oven, and the board of control is configured for increasing or to decrease the speed of the conveyor belt of the oven and/or to decrease or increasing the heating power of the oven responsive to the signal, in order to allow the dishes to result to the temperature T directly at the outlet of the oven. This way, it is avoided excessive heat scattering of the hot dishes in the environment and is obtained an optimization of the time for heating.

BRIEF DESCRIPTION OF THE DRAWINGS

Further characteristic and the advantages of the method and of the machine for making panigacci, according to the invention, will be made clearer with the following description of an exemplary embodiment thereof, exemplifying but not limitative, with reference to the attached drawings, in which like reference characters designate the same or similar parts, throughout the figures of which.

DESCRIPTION OF A PREFERRED EXEMPLARY EMBODIMENT

Figure 1:
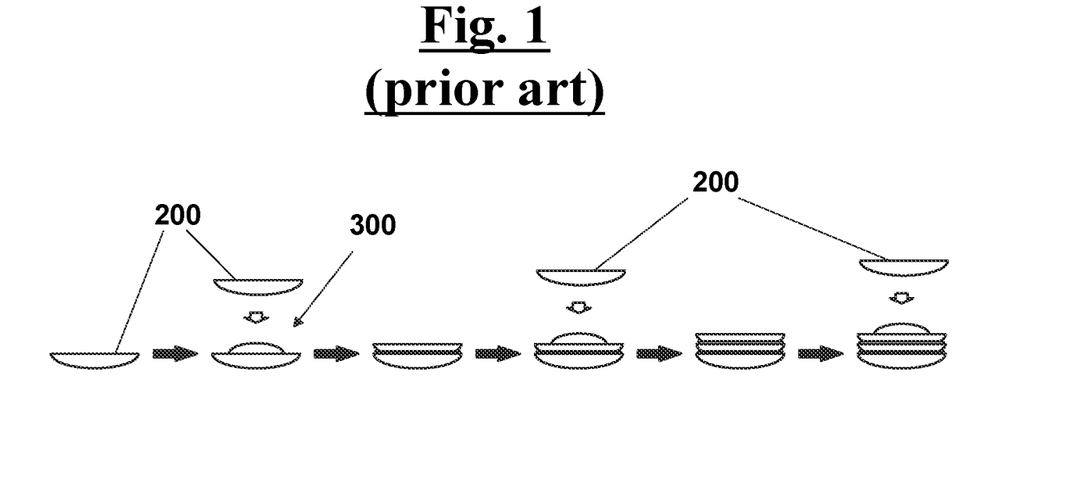
FIG. 1 diagrammatically shows a production step of panigacci, by means of dishes and dough, according to the prior art.
Figure 1A:
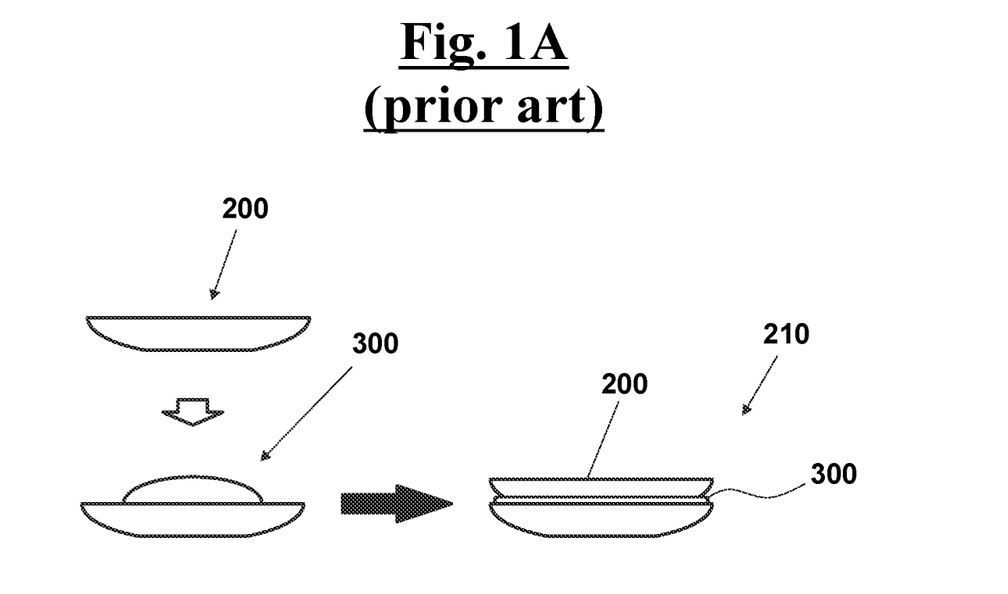
FIG. 1A shows a detail of FIG. 1.

With reference to FIG. 1, and to FIG. 1A, for making panigacci, according to the prior art, it is necessary to provide dishes in terracotta 200, which have to be previously heated, in oven or on fire.

A step follows of arranging a first hot dish 200' in a plane and the distributing a first dose of dough 300; arranging a second hot dish 200 on the first dish, in order to squeeze the dough 300 between the two dishes 200, and the distributing a second dose of dough 300 on the second dish, and the like with following dispositions and distributions, up to end of the plurality of hot dishes making a stack 210 of hot dishes 200 interspersed by dough 300, with subsequent cooking of the dough and preparing panigacci after separating the dishes 200 by the stack 210.

Figure 2:
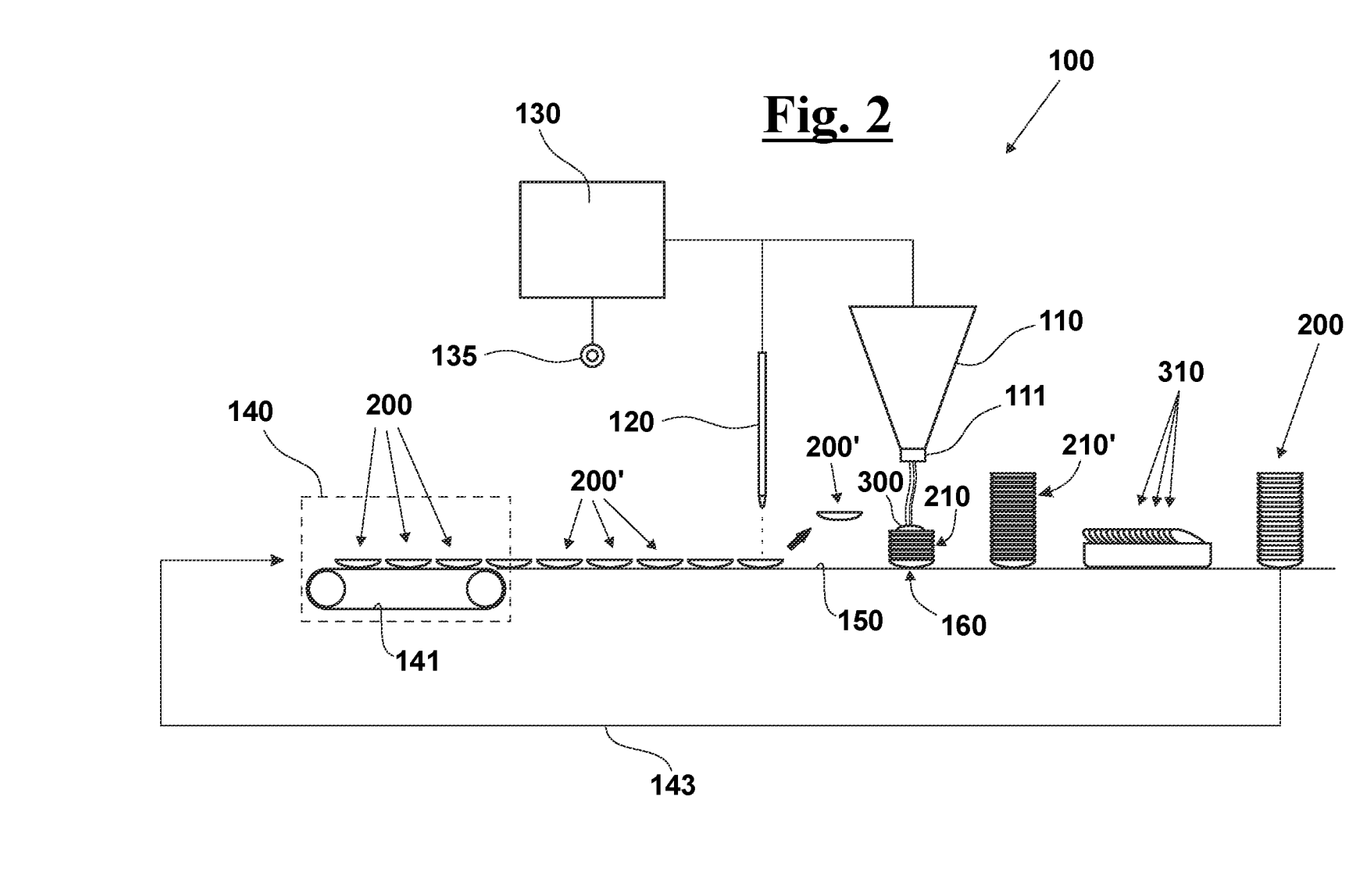
FIG. 2 shows an apparatus and steps of the method for making panigacci according to a first exemplary embodiment of the invention.
Figure 4:
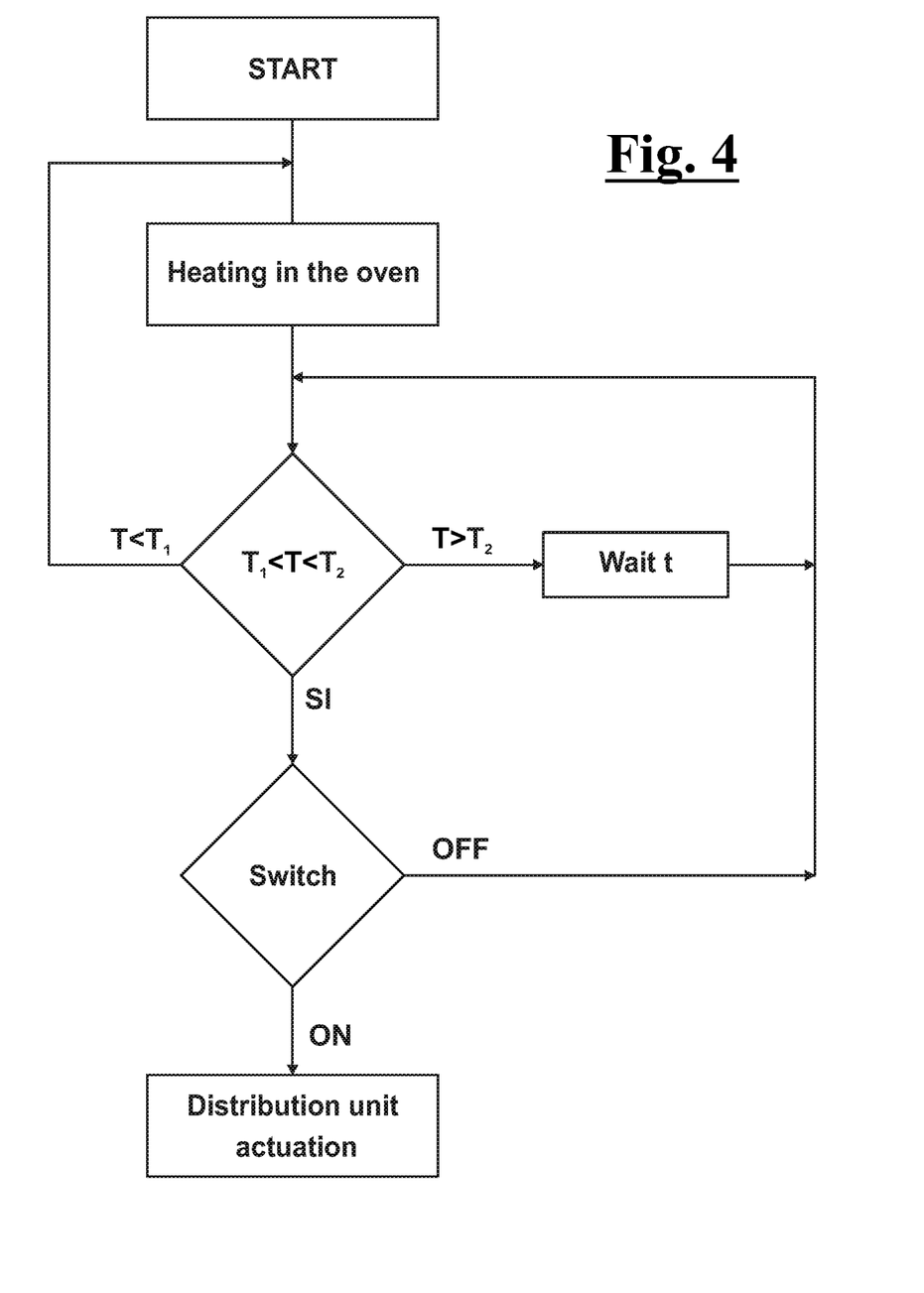
FIG. 4 shows a flow-sheet of the control unit for the machine of FIG. 2 or 3.

With reference to FIG. 2, and to FIG. 4, before the step of arranging a step is provided of exposing each hot dish 200' at a temperature sensor 120, and a step of measurement the temperature T of each hot dish 200' with production of a signal of temperature that is provided to a control unit 130.

The temperature is compared with limit values T1 and T2 by the control unit 130, which is configured to provide a consent signal in case that T1<T<T2, with T1=280° C. and T2=360° C.

The distribution of the paste 300 is made by a distribution unit 110, 111 that provides to the hot dish 200' a predetermined dose of dough 300. The distribution unit 110, 111 is operated through the control unit 130 to provide the dose 300 in the presence of the consent signal.

For carrying out the method above described, still with reference to FIG. 2, an apparatus 100 for making panigacci 310 comprises a heating unit 140 of the dishes of terracotta 200 at the predetermined temperature (enough larger than 280-300° C.).

The hot dishes 200' come to a plane support 150 so that they are ready for being put in an arrangement zone 160 and form the stack 210 of dishes and dough.

Next to the arrangement zone 160 a temperature sensor 120 is provided towards which each hot dish 200' is exposed.

The temperature sensor 120 being configured for producing a signal of temperature T measuring the temperature of each dish 200.

A control unit 130 is configured to receive the signal of temperature T and is configured for carrying out a comparison of the temperature T with limit values T1 and T2 and to provide a consent signal in case that T1<T<T2, with T1=280° C. and T2=360° C.

At the arrangement zone 160 is provided a distribution unit 110, 111 configured to provide to each hot dish 200' a predetermined dose of dough 300, and it is connected to the control unit 130, so that the latter can operate the distribution unit 110, 111 allowing it to provide the dose 300 of dough in presence of the consent of temperature obtained by the measure by the sensor 120.

The distribution unit 110, 111 can comprise a hopper 110 containing dough 300, and a dosing element 111 at the basis of the hopper 110. The hopper is at a height easily rechargeable by the operator with fresh dough.

The dosing element 111 can be operated electrically, for causing the predetermined dose of dough 300 to fall in a hot dish 200' located underneath.

For example, a drive element 135 can be provided, which can be a manual key or pedal or an automatic drive that operates automatically the dosing element 111 in the presence of the consent, or a wireless remote control.

The control unit 130 may comprise, in a way not shown, a display unit which indicates if a dish 200' subject to temperature measure is within condition T1<T<T2 or is out of this range.

As shown in FIG. 2, the heating unit 140 can comprise an oven with a conveyor belt for carrying the dishes 200 between an input, wherein cold dishes 200 are arranged, and an outlet, from which hot dishes 200 exit. It can be an electric oven, even if it is obviously possible that are made also ovens of different type, as also traditional ovens using wood or coal.

Figure 3:
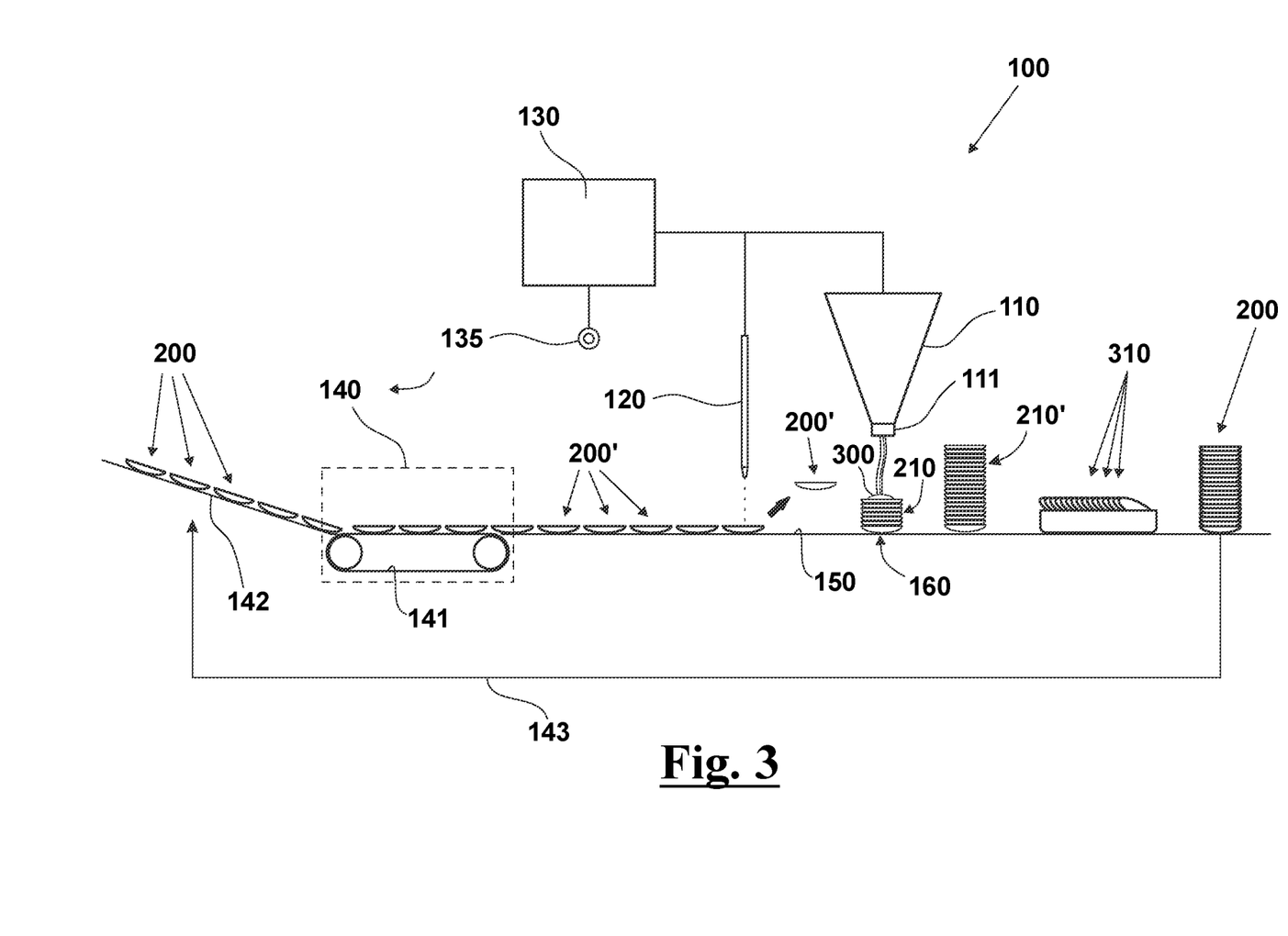
FIG. 3 shows an alternative embodiment with respect to the machine of FIG. 2, with dishes fed to the oven by a slide.

As shown in FIG. 3 as input a slide 142 can be provided, in such a way that the operator can feed the cold dishes 200 on the slide 142, so that they reach by gravity the belt.

Figure 5:
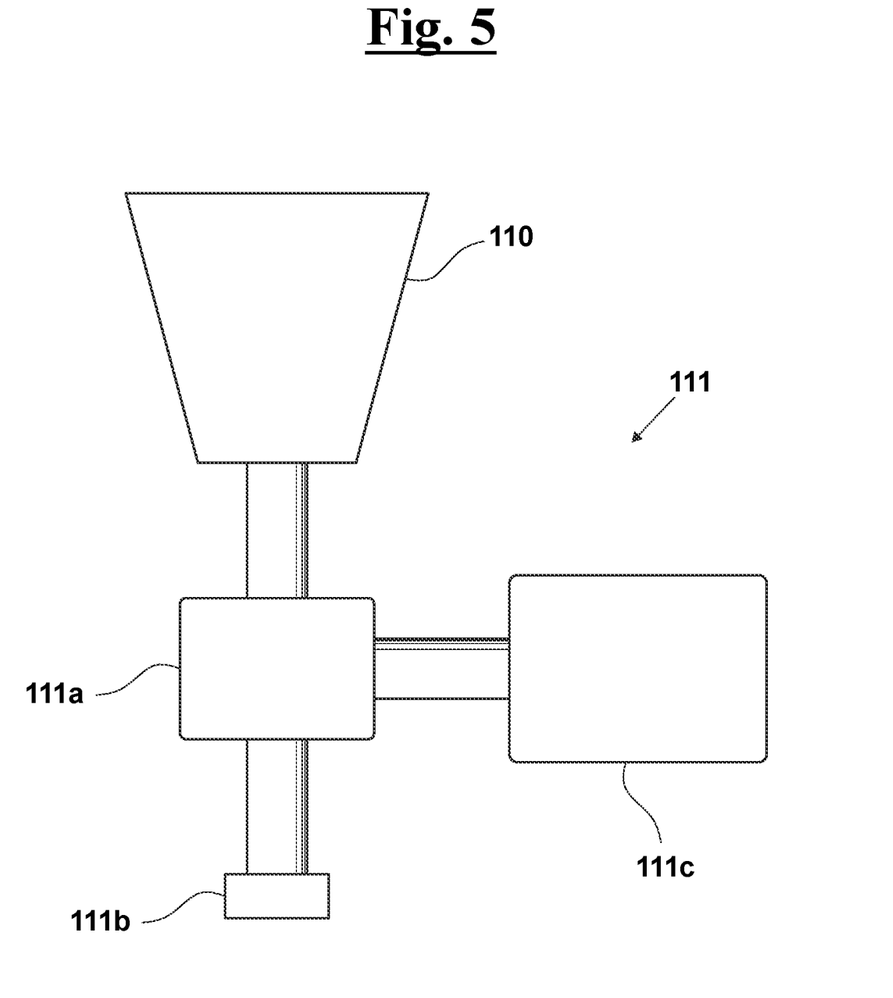
FIG. 5 shows a detail of an unit for distributing the dough.

With reference to FIG. 5, the dosing element 111 can comprise a volumetric pump 111a operated by a motor, for example a gear pump and a doser 111b and motor 111c.

Figure 6:
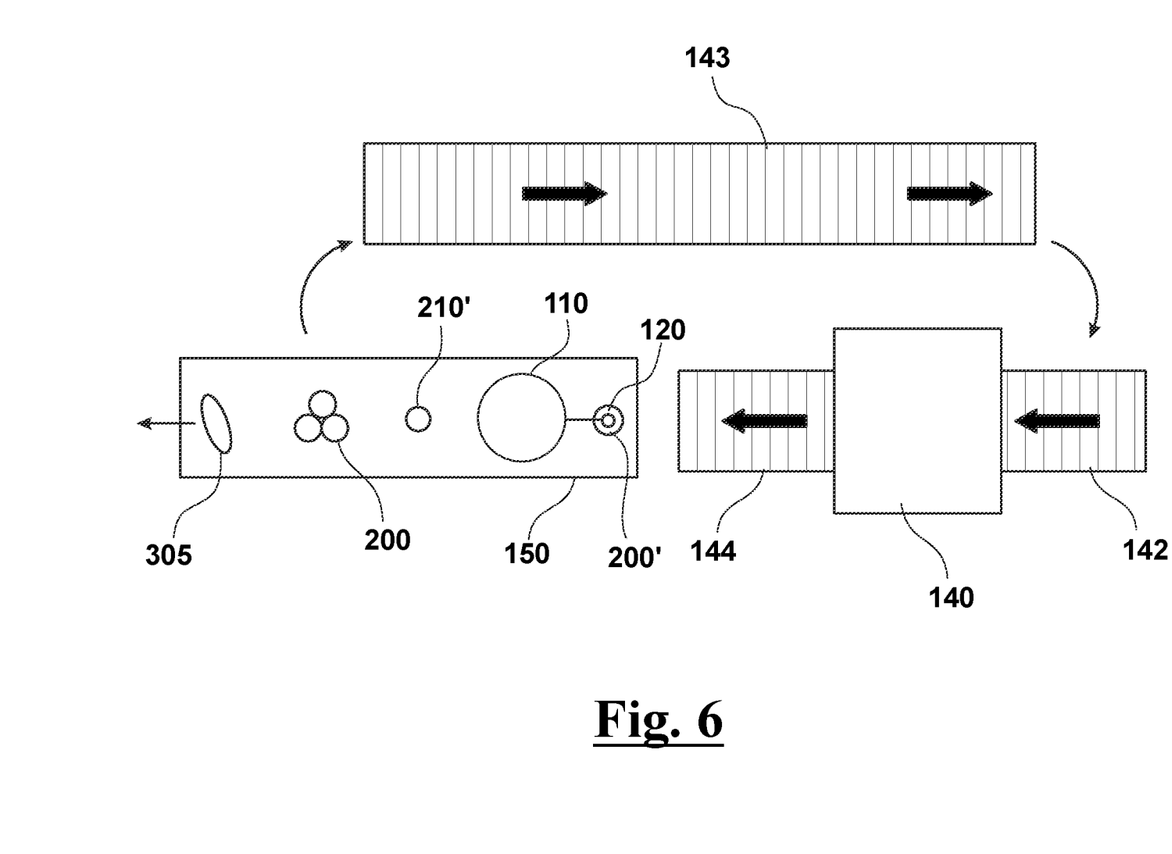
FIG. 6 shows a top plan view of an alternative embodiment with respect to the machine of FIG. 2, with conveyor belt for feeding to the oven the dishes freed by the panigacci already cooked.

With reference to FIG. 6, which shows a top plan view of an alternative embodiment with respect to the machine of FIG. 2 or of FIG. 3, a conveyor belt 143 can be provided for feeding to the oven 140 the dishes 200 freed by the panigacci 310 already cooked. Such solution remarkably simplifies the preparation, since it allows the operator not to return the dishes manually to the oven 140. Even in this case, the hot dishes 200' from the outlet 144 reach the support plane 150 and subject to the temperature sensor 120 after having immediately the comparison of the temperature T within the limit values T1 and T2 is located under the distribution unit 110. Once the stack is formed, it is removed by below the distribution unit 110 to start a new stack. The formed stack and left awaiting cooking, indicated as 210', is then decomposed, arranging panigacci in the tray 305, ready for being served hot, and instead arranging dishes empty 200 on the conveyor belt 143, which brings them towards the slide 142, in the towards of the arrows. Such circular path makes it possible to a single operator, which is located between the conveyor belt 143, on the one hand, and support plane 150 and the oven 140, by the other, of carrying out all the operations above described.

Figure 7:
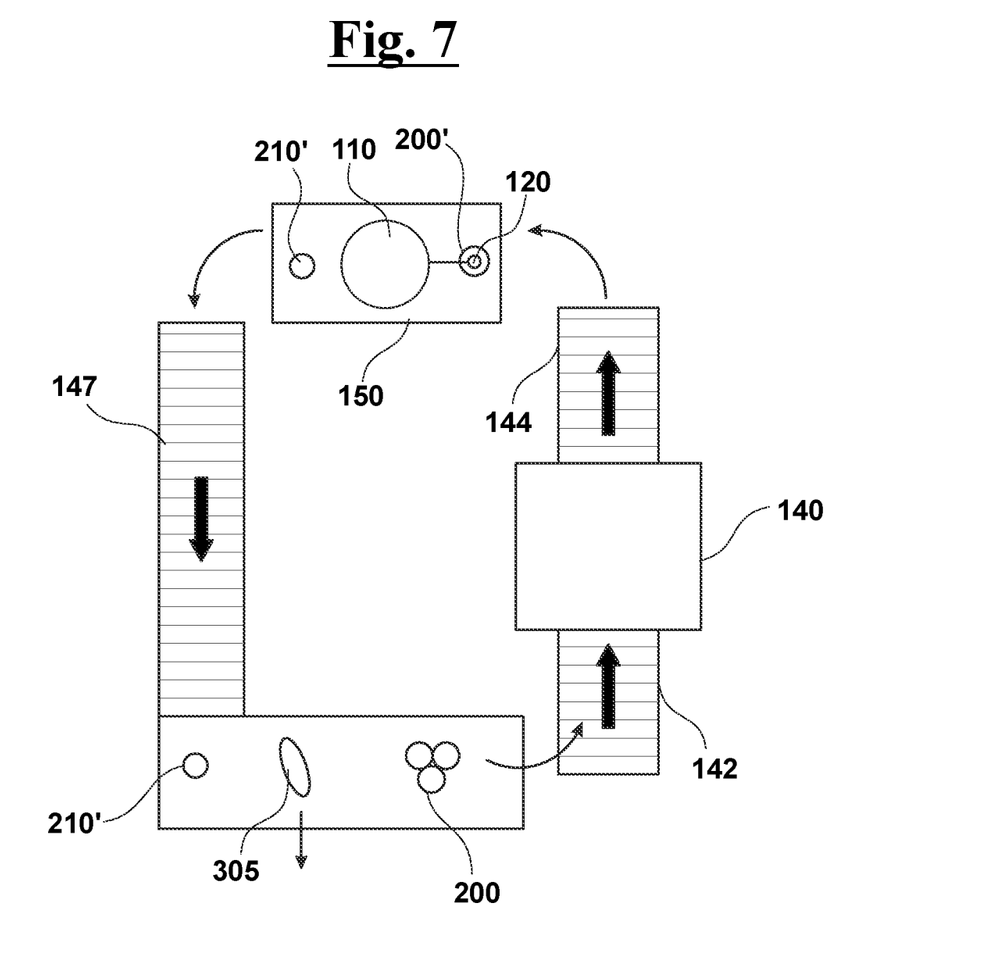
FIG. 7 shows a top plan view of an alternative embodiment with respect to the machine of FIG. 6, with circular layout.

Alternatively, substantially in same way, but more compact in terms of space, with reference to FIG. 7, in an exemplary embodiment, in a similar circular layout is provided, similarly to FIG. 6, that the hot dishes 200' from the outlet 144 reach the plane support 150 and are subjected to the temperature sensor 120, and that, after having immediately the comparison of the temperature T within the limit values T1 and T2 are located under the distribution unit 110, arranging stack awaiting cooking, indicated as 210', at first in the plane 150. The stack 210' then, through a conveyor belt 147, achieves a position opposite to the plane support 150, where is decomposed, arranging panigacci in the tray 305, ready for being served hot, and instead arranging empty dishes 200 directly on the slide 142, in the towards of the arrows. Such circular path makes it possible to a single operator, or to two operators that are located between the conveyor belt 147, on the one hand, and the oven 140, by the other, of carrying out all the operations above described. The conveyor belt 147 has a time of carrying the stack 210' equal to the time for cooking, so that the operator knows that when the stack 210' is at the end of the conveyor belt 147 it is ready for being decomposed.

Figure 8A:
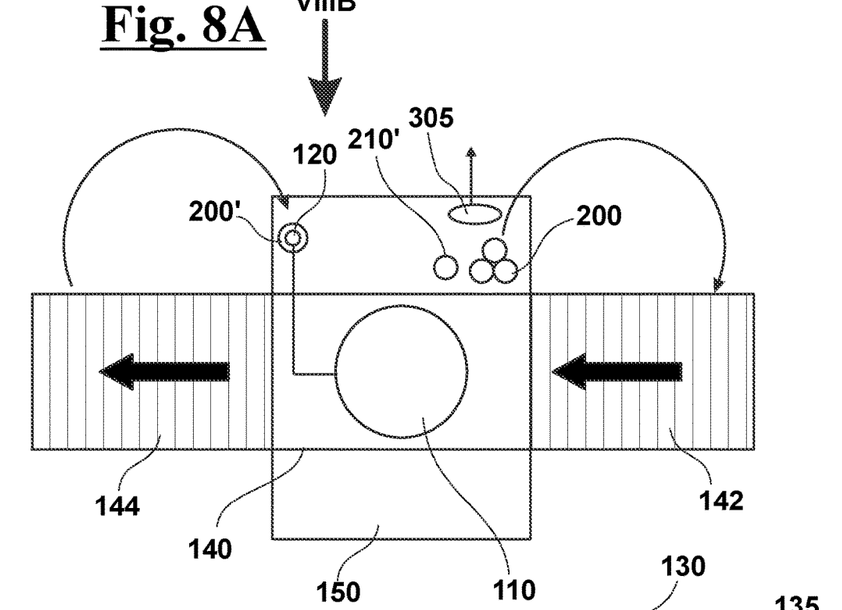
FIGS. 8A and 8B show respectively a top plan view and an elevational view, from the side of the arrow VIIIB, of an exemplary embodiment simplified of the machine of FIG. 6.
Figure 8B:
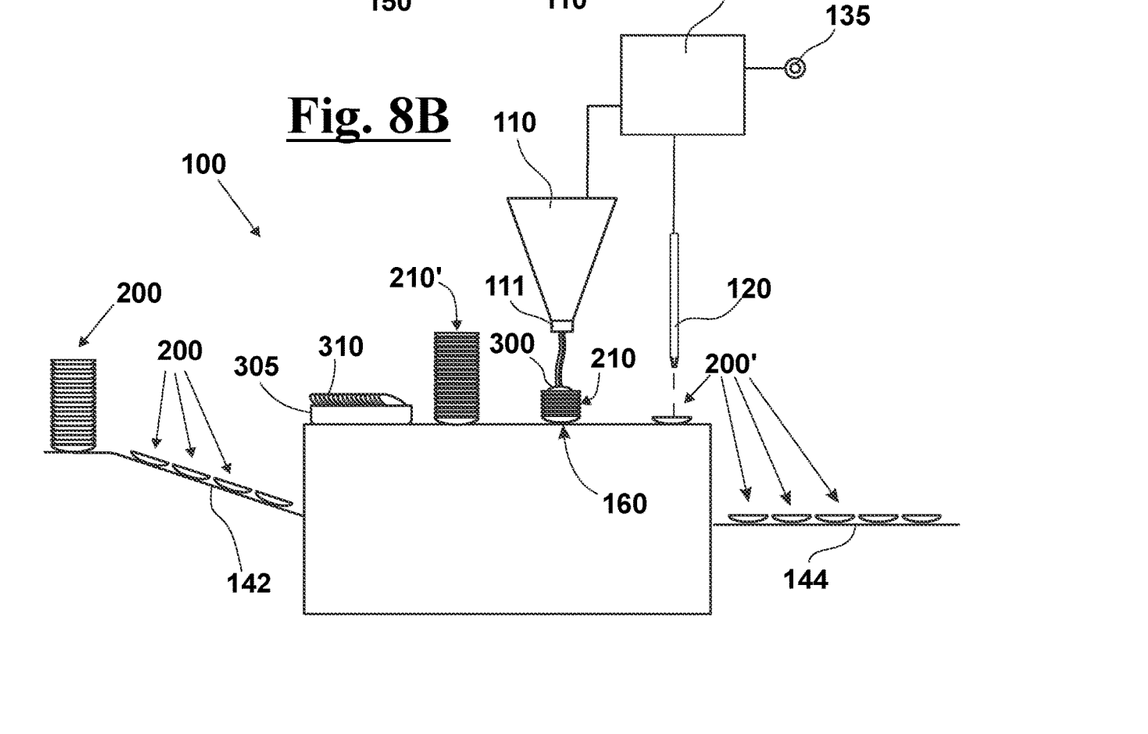

With reference to FIGS. 8A and 8B, in a top plan view and in elevation of an exemplary embodiment simplified of the machine of FIG. 6 or 7, the support plane 150 can be arranged above the oven 140, for optimization the spaces. In particular, the hot dishes 200' from the outlet 144 reach the plane support 150 above the oven 140, and are subjected to the temperature sensor 120, and that, after having immediately the comparison of the temperature T within the limit values T1 and T2 are located under the distribution unit 110 forming the stack. The stack awaiting the time for cooking remains in the plane 150 where is then decomposed, arranging panigacci in the tray 305, ready for being served hot, and instead arranging empty dishes 200 directly on the slide 142, in the towards of the arrows. Such path very compact makes it possible to provide the position in places with not much space, or in mobile bars.

Figure 9:
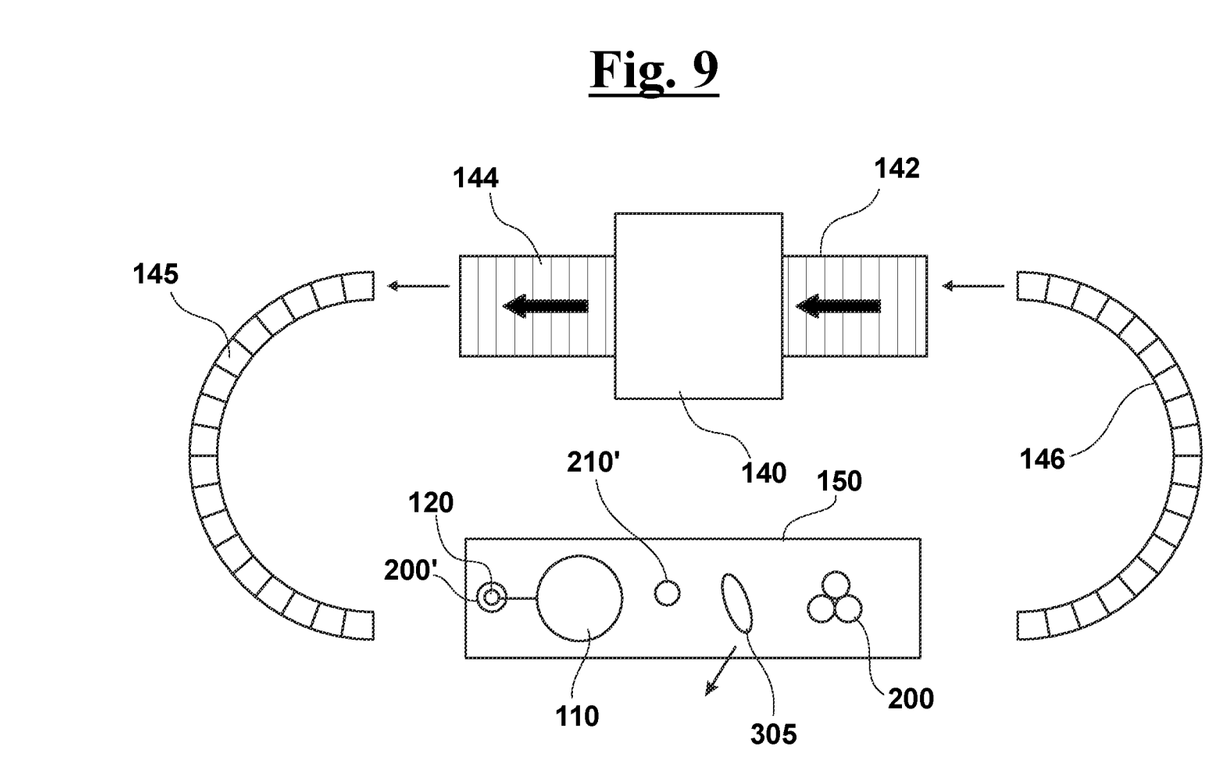
FIG. 9 shows a top plan view of a further exemplary embodiment simplified of the machine of FIG. 6, with circular layout.

With reference to FIG. 9, in a further exemplary embodiment simplified of the machine of FIG. 6, also here with circular layout, the plane 150 and the oven 140 can be arranged opposite to each other, with conveyor belts or roller conveyors 145 and 146 that bring respectively the hot dishes 200' and the dishes to heat 200, following the towards of the arrows. Such solution is advantageous to provide an island with high effectiveness for a single operator.

Figure 10:
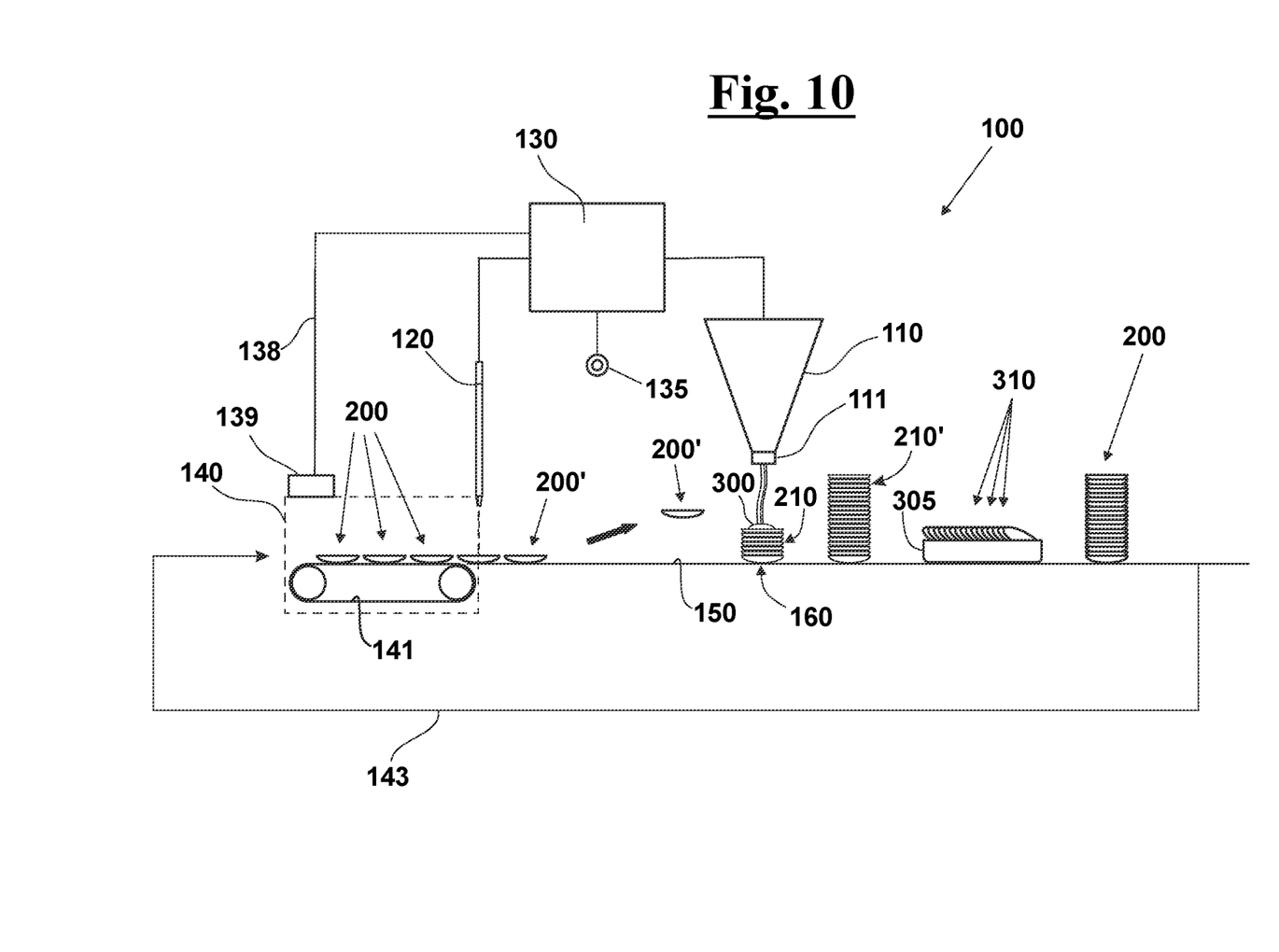
FIG. 10 shows a top plan view of an exemplary embodiment with respect to the machine of FIG. 2, with measuring the temperature in the oven or at the outlet of the oven.

With reference to FIG. 10, in an elevational view of further an exemplary embodiment with respect to the machine of FIG. 2 or 3, the measurement of the temperature of the hot dishes 200' by the sensor 120 can be carried out directly in the oven 140 near the outlet or immediately at the outlet of the oven same. Such determines to have indication of how much actually the oven warms, for maximizing the efficiency versus time and for energy saving.

In a possible further exemplary embodiment, a control signal 138 that is function of the temperature, can be treated by the control unit 130 and sent by means of a board 139 for controlling the oven. If the control unit detects that the temperature of outlet T by the oven is too high or too low with respect to predetermined values in the range between T1 and T2, the oven 140, through the board 139, can increase or decrease the speed of the conveyor belt 141, or decrease or increase the heating power of the oven same. This way, it is avoided excessive scattering heat of the hot dishes in the environment and is obtained an optimization of the time for heating.

In all the examples shown above, the ideal temperature T of the dishes can be selected from the group consisting of: the limit values T1=280° C. and T2=360° C., for achieving optimal cooking without burn outside the panigacci and allowing cooking inside without leaving raw parts. An ideal temperature is about with T1=300° C. and T2=340° C., and much more preferably with T1=310° C. and T2=330° C.

The foregoing description of specific exemplary embodiments will so fully reveal the invention according to the conceptual point of view, so that others, by applying current knowledge, will be able to modify and/or adapt in various applications the specific exemplary embodiments without further research and without parting from the invention, and, accordingly, it is meant that such adaptations and modifications will have to be considered as equivalent to the specific embodiments. The means and the materials to realize the different functions described herein could have a different nature without, for this reason, departing from the field of the invention. It is to be understood that the phraseology or terminology that is employed herein is for the purpose of description and not of limitation.

The invention claimed is:

1. A method for making panigacci, comprising the steps of:
prearranging a plurality of dishes of terracotta;
heating said dishes at a temperature higher than 280° C., said heating carried out by a heating unit, in order to obtain hot dishes;
arranging a first hot dish on a plane;
exposing said first hot dish to a temperature sensor;
measuring by said temperature sensor the temperature T of said first hot dish;
providing by said temperature sensor a signal of the measured temperature T of said first hot dish to a control unit;

comparing said temperature T with limit values T1=280° C. and T2=360° C. by said control unit;

providing by said control unit a consent signal when T1<T<T2;

in the case that said consent signal is provided for said first hot dish, distributing a dose of fluid dough on said first hot dish by a distribution unit;

arranging a second hot dish on said plane;

exposing said second hot dish to said temperature sensor;

measuring the temperature T of said second hot dish;

providing a signal of the measured temperature T of said second hot dish to a control unit;

comparing said temperature T with limit values T1=280° C. and T2=360° C. by said control unit;

providing by said control unit a consent signal when T1<T<T2;

in the case that said consent signal is provided for said second hot dish, arranging said second hot dish on said dose of fluid dough previously arranged on said first hot dish, in order to squeeze the first dose of fluid dough between said first and second hot dishes, and distributing a second dose of fluid dough on said second hot dish by said distribution unit;

repeating the steps carried out for said second hot dish for following dishes of said plurality of dishes and respective following doses of fluid dough, thereby making a stack of said hot dishes interspersed by said doses of fluid dough, with subsequent cooking of the interspersed doses of fluid dough and obtaining panigacci after separation from the dishes of the stack.

2. The method according to claim 1, wherein said distribution unit comprises a hopper, arranged to contain said fluid dough, and a dosing element at a base of said hopper.

3. The method according to claim 2, wherein said dosing element is electrically operated, for causing said dose of fluid dough to fall in said hot dish located underneath said dosing element.

4. The method according to claim 2, wherein said dosing element comprises a positive displacement pump operated by a motor, wherein said positive displacement pump is a gearing pump.

5. The method according to claim 1, wherein said heating unit comprises an oven with a conveyor belt for carrying the dishes between an input, wherein unheated dishes are arranged, and an outlet, from which heated dishes exit.

6. The method according to claim 5, wherein said heating unit comprises a slide, in such a way that an operator can introduce the unheated dishes on said slide, so that the unheated dishes reach the conveyor belt by gravity.

7. The method according to claim 1, wherein said control unit comprises a display unit which indicates if the temperature of a hot dish subjected to the temperature measurement is within the condition T1<T<T2.

8. The method according to claim 2, where the control unit is configured to operate said distribution unit by means of a drive element selected from the group consisting of: an automatic drive that automatically operates said dosing element in response to said consent signal, a manual key, a pedal, and a wireless remote control.

9. The method according to claim 2, wherein said plane is arranged above said heating unit.

10. The method according to claim 6, wherein a conveyor is provided for bringing dishes from said slide to said heating unit.

11. The method according to claim 5, wherein said temperature sensor is arranged so that the measurement of the temperature of the hot dishes is carried out on said plane said outlet of the heating unit, wherein said control unit is configured for sending a control signal to an electronic board for controlling the heating unit, said electronic board being configured to increase or decrease a speed of the conveyor belt of the oven and/or to decrease or increase a heating power of the oven as a function of said consent signal, thereby allowing said dishes to result in said temperature T directly at the outlet of the heating unit, said temperature T being within the condition T1<T<T2.

12. The method according to claim 2, wherein said heating unit comprises an oven with a conveyor belt for carrying the dishes between an input, wherein unheated dishes are arranged, and an outlet, from which said hot dishes exit.

13. The method according to claim 2, wherein said control unit comprises a display unit which indicates if the temperature of a dish subjected to the temperature measurement is inside or outside the condition T1<T<T2.

14. The method according to claim 2, wherein said plane is arranged above said heating unit.

15. The method according to claim 1, wherein said limit values T1 and T2 are set as T1=300° C. and T2=340° C.

16. The method according to claim 1, wherein said limit values T1 and T2 are set as T1=310° C. and T2=330°.

* * * * *